(12) United States Patent
Nishiyama

(10) Patent No.: US 10,671,978 B2
(45) Date of Patent: Jun. 2, 2020

(54) MAIL-FORMAT CONFIRMATION SYSTEM AND RECORDING MEDIUM

(71) Applicant: Kyocera Document Solutions Inc., Osaka (JP)

(72) Inventor: Hisakazu Nishiyama, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/115,361

(22) Filed: Aug. 28, 2018

(65) Prior Publication Data

US 2019/0066053 A1   Feb. 28, 2019

(30) Foreign Application Priority Data

Aug. 28, 2017   (JP) .................................. 2017-163360

(51) Int. Cl.
*G06Q 10/10*   (2012.01)
*H04L 12/58*   (2006.01)
*H04N 1/00*   (2006.01)

(52) U.S. Cl.
CPC ......... *G06Q 10/107* (2013.01); *H04L 51/066* (2013.01); *H04L 51/22* (2013.01); *H04N 1/00007* (2013.01); *H04N 2201/0094* (2013.01)

(58) Field of Classification Search
CPC ............. G06Q 10/107; H04N 1/00007; H04N 2201/0094; H04L 51/22; H04L 51/066; H04L 51/30; H04L 1/0028; H04L 1/003; H04L 1/0078; H04L 1/0079; H04L 1/0091; H04L 12/2823; H04L 43/00

USPC ......................................................... 709/223
See application file for complete search history.

(56) References Cited

U.S. PATENT DOCUMENTS

| | | | | |
|---|---|---|---|---|
| 5,742,905 A | * | 4/1998 | Pepe ................. | H04L 29/06027 455/461 |
| 5,870,756 A | * | 2/1999 | Nakata ................ | G06F 3/0601 |
| 7,007,104 B1 | * | 2/2006 | Lewis .................. | H04L 41/042 709/206 |
| 8,260,900 B2 | * | 9/2012 | Morrison ............... | H04L 29/00 709/223 |
| 8,489,683 B2 | * | 7/2013 | Leblanc .............. | H04L 67/2823 709/204 |
| 8,645,544 B2 | * | 2/2014 | Girard .................... | G06Q 30/06 707/708 |
| 2002/0055995 A1 | * | 5/2002 | Beckwith ............. | H04Q 3/0029 709/223 |
| 2002/0116465 A1 | * | 8/2002 | Kim ........................ | H04L 29/06 709/206 |
| 2003/0096600 A1 | * | 5/2003 | Lewis ..................... | H04L 29/06 455/412.1 |
| 2004/0196900 A1 | * | 10/2004 | Lim ................ | H04N 21/234309 375/240 |

(Continued)

FOREIGN PATENT DOCUMENTS

JP   2010-034816 A   2/2010

*Primary Examiner* — Michael Won
(74) *Attorney, Agent, or Firm* — James Judge

(57) ABSTRACT

A mail-format confirmation system includes a mail-format confirming unit that executes a confirmation as to whether format of a maintenance mail, as an e-mail for reporting device information about an electronic device, is a specific format processable by a device-information accumulation system. The device-information accumulation system obtains and accumulates the device information from the maintenance mail.

7 Claims, 14 Drawing Sheets

(56) References Cited

U.S. PATENT DOCUMENTS

| | | | | |
|---|---|---|---|---|
| 2004/0215472 | A1* | 10/2004 | Gleckman | G06Q 10/107 709/206 |
| 2009/0168651 | A1* | 7/2009 | Xie | H04L 63/145 370/235 |
| 2012/0016976 | A1* | 1/2012 | Voellmann | G06F 16/178 709/223 |
| 2013/0218986 | A1* | 8/2013 | Sobhani | H04L 51/22 709/206 |
| 2013/0304570 | A1* | 11/2013 | Johnson | G06Q 30/02 705/14.45 |

* cited by examiner

FIG. 11

| Item | Contents |
|---|---|
| Subject | [Maintenance Mail] Communication Confirmation Format Anomaly |
| Body Text | The serial No. for execution of the maintenance-mail communication confirmation has not been obtained. Please describe the correct serial No. in the subject or the body text and retransmit. |

FIG. 12A

| Item | Contents |
|---|---|
| Subject | [Maintenance Mail] Serial No. [N2N1234567] Communication-Confirmation Result |
| Body Text | The communication-confirmation result of the maintenance mail will be reported.<br><br>Serial No.: N2N1234567<br>Communication-Confirmation Result: No corresponding mail<br><br>Countermeasures:<br>• Please confirm the maintenance-mail transmission settings of the printer/MFP. |

FIG. 12B

| Item | Contents |
|---|---|
| Subject | [Maintenance Mail] Serial No. [N2N1234567] Communication-Confirmation Result |
| Body Text | The communication-confirmation result of the maintenance mail will be reported.<br><br>Serial No.: N2N1234567<br>Communication-Confirmation Result: Valid<br>Reception Date and Time: 2017/03/29 15:30:30 |

FIG. 13A

| Item | Contents |
|---|---|
| Subject | [Maintenance Mail] Serial No. [N2N1234567] Communication-Confirmation Result |
| Body Text | The communication-confirmation result of the maintenance mail will be reported.<br><br>Serial No.: N2N1234567<br>Communication-Confirmation Result: Anomaly (HTML mail format)<br>Reception Date and Time: 2017/03/29 15:30:30<br><br>Countermeasures:<br>• Please select text as the mail format of the maintenance-mail transmission settings of the printer/MFP. |

FIG. 13B

| Item | Contents |
|---|---|
| Subject | [Maintenance Mail] Serial No. [N2N1234567] Communication-Confirmation Result |
| Body Text | The communication-confirmation result of the maintenance mail will be reported.<br><br>Serial No.: N2N1234567<br>Communication-Confirmation Result: Anomaly (insufficient report [EventLog/StatusPage])<br>Reception Date and Time: 2017/03/29 15:30:30<br><br>Countermeasures:<br>• Please check the following items in the report types of the maintenance-mail transmission settings of the printer/MFP. When all the reports are not attached, there is possibility of file compression in customer's environment.<br>• Event Log<br>• Status Page |

FIG. 14

| Item | Contents |
|---|---|
| Subject | [Maintenance Mail] Serial No. [N2N1234567] Communication-Confirmation Result |
| Body Text | The communication-confirmation result of the maintenance mail will be reported.<br><br>Serial No.: N2N1234567<br>Communication-Confirmation Result: Anomaly (HTML mail format/ insufficient report [EventLog/StatusPage])<br>Reception Date and Time: 2017/03/29 15:30:30<br><br>Countermeasures:<br>• Please select text as the mail format of the maintenance-mail transmission settings of the printer/MFP.<br>• Please check the following items in the report types of the maintenance-mail transmission settings of the printer/MFP.<br>When all the reports are not attached, there is possibility of file compression in customer's environment.<br>• Event Log<br>• Status Page |

MAIL-FORMAT CONFIRMATION SYSTEM AND RECORDING MEDIUM

INCORPORATION BY REFERENCE

This application is based upon, and claims the benefit of priority from, corresponding Japanese Patent Application No. 2017-163360, filed in the Japanese Patent Office on Aug. 28, 2017 and the entire contents of which are incorporated herein by reference.

BACKGROUND

Unless otherwise indicated herein, the description in this section is not prior art to the claims in this application and is not admitted to be prior art by inclusion in this section.

Image forming apparatuses that via e-mail transmit to a serviceperson information on the devices themselves are known.

SUMMARY

A mail-format confirmation system according to one aspect of the disclosure includes a mail-format confirmation unit for executing confirmation as to whether format of a maintenance mail, as an e-mail for reporting device information about an electronic device, is a specific format processable by a device-information accumulation system. The device-information accumulation system obtains and accumulates the device information from the maintenance mail.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 11 illustrates one example of a subject and a body text of a format-anomaly-notification mail transmitted by the mail server in the operations illustrated in FIG. 9.

FIG. 12A illustrates one example of a subject and a body text of the communication-confirmation-result mail indicating a fact that a corresponding maintenance mail has not been received from the image forming apparatus among communication-confirmation-result mails transmitted by the mail server in the operations illustrated in FIG. 9.

FIG. 12B illustrates one example of the subject and the body text of the communication-confirmation-result mail indicating a fact that a valid maintenance mail has been received from the image forming apparatus among the communication-confirmation-result mails transmitted by the mail server in the operations illustrated in FIG. 9.

FIG. 13A illustrates one example of the subject and the body text of the communication-confirmation-result mail indicating a fact that a maintenance mail where a message format is HTML format has been received from the image forming apparatus among the communication-confirmation-result mails transmitted by the mail server in the operations illustrated in FIG. 9.

FIG. 13B illustrates one example of the subject and the body text of the communication-confirmation-result mail indicating a fact that a maintenance mail where types of attached reports are insufficient has been received from the image forming apparatus among the communication-confirmation-result mails transmitted by the mail server in the operations illustrated in FIG. 9.

FIG. 14 illustrates one example of the subject and the body text of the communication-confirmation-result mail indicating a fact that a maintenance mail where the message format is the HTML format and types of the attached reports are insufficient has been received from the image forming apparatus among the communication-confirmation-result mails transmitted by the mail server in the operations illustrated in FIG. 9.

DETAILED DESCRIPTION

Figure 1:
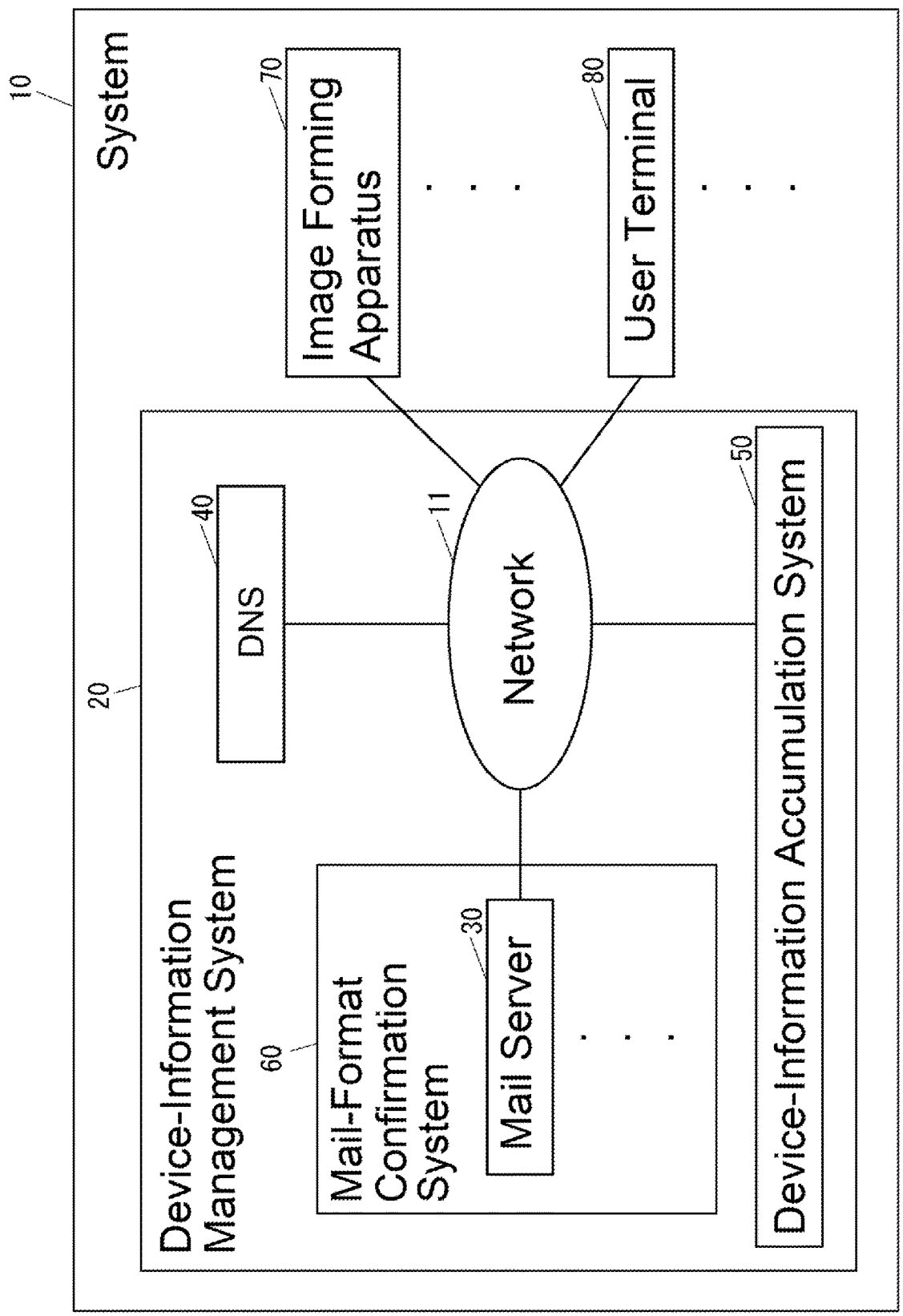
FIG. 1 illustrates a block diagram illustrating a system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the accompanied drawing.

First, a description will be given of a configuration of a system according to the embodiment.

FIG. 1 illustrates a block diagram illustrating a system 10 according to the embodiment.

As illustrated in FIG. 1, the system 10 includes a device-information management system 20, an image forming apparatus 70, and a user terminal 80. The device-information management system 20 is a system for managing device information such as operation information of an electronic device. The image forming apparatus 70 is an electronic device (hereinafter referred to as "management target device") of a management target by the device-information management system 20. The user terminal 80 is used by a user of the device-information management system 20, such as a service person who manages the management target device.

The system 10 can also include an image forming apparatus as the management target device other than the image forming apparatus 70. The image forming apparatus included in the system 10 is an image forming apparatus, such as a multifunction peripheral (MFP) and a printer-only machine.

The system 10 can also include a user terminal used by a service person other than the user terminal 80. The user terminal included in the system 10 is a computer, for example, a mobile phone such as a smart phone, a tablet, or a personal computer (PC).

The device-information management system 20 includes a mail server 30 for receiving an e-mail (hereinafter referred to as "maintenance mail") for reporting the device information about the management target device. The device-information management system 20 includes at least one mail server for receiving the maintenance mail other than the mail server 30.

The device-information management system 20 includes a domain name system (DNS) 40 and a device-information accumulation system 50. The DNS 40 automatically sorts out the e-mails into the mail servers included in the device-information management system 20. The device-information accumulation system 50 obtains and accumulates the device information of the management target device from the maintenance mails received by the mail servers included in the device-information management system 20 to output various kinds of reports based on the accumulated device information. The DNS 40 and the device-information accumulation system 50 are each cloud service.

The mail server 30 included in the device-information management system 20 configures a mail-format confirmation system 60 as a whole for a confirmation (hereinafter referred to as "communication confirmation") of whether the format of the maintenance mail is a specific format processable by the device-information accumulation system 50 or not.

The mail servers included in the system 10, the DNS 40, the device-information accumulation system 50, the image forming apparatuses included in the system 10, and the user terminals included in the system 10 are communicable with one another via a network 11 such as the Internet.

Figure 2:
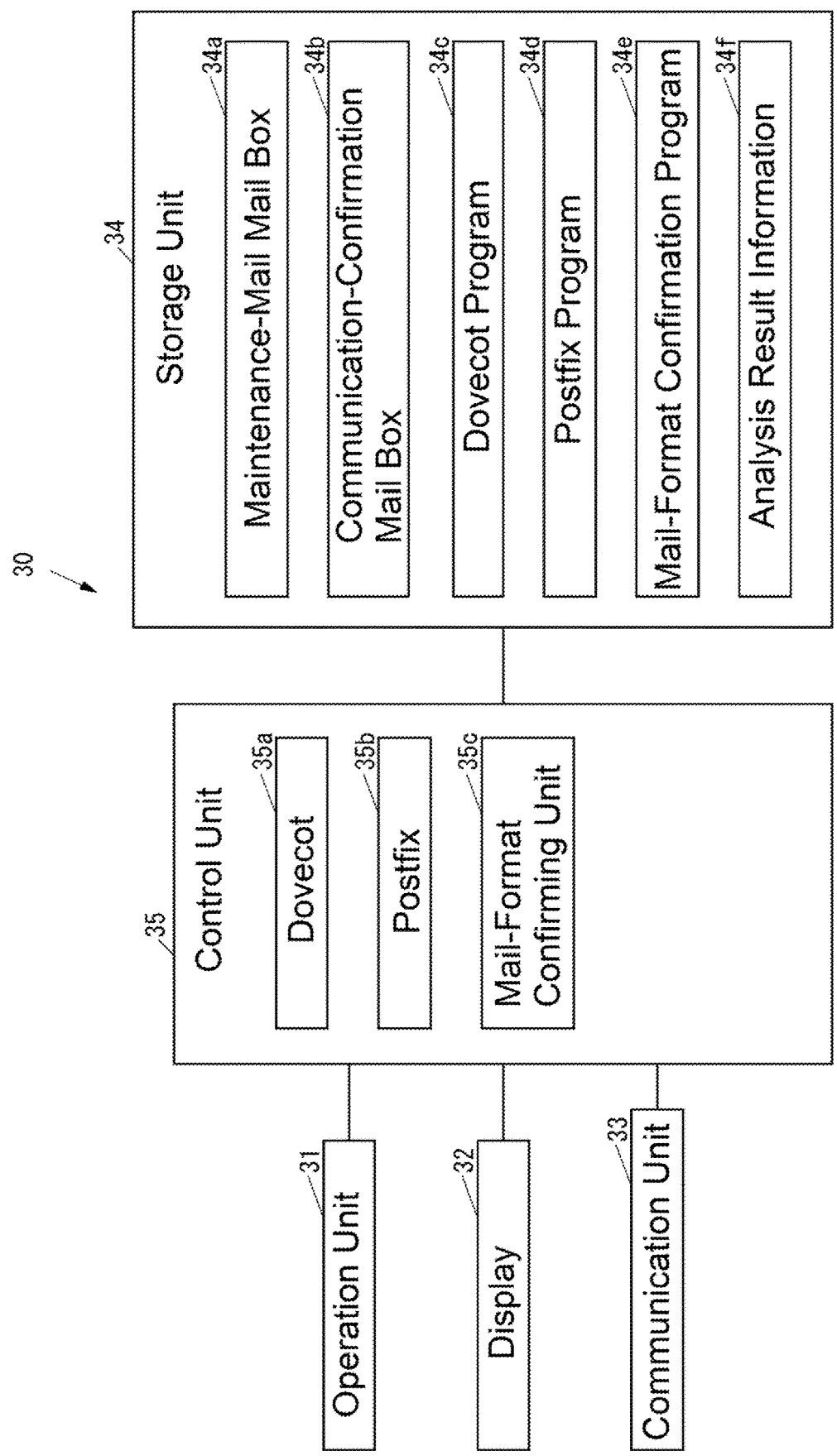
FIG. 2 illustrates a block diagram illustrating a mail server according to the one embodiment when the mail server is achieved by one computer.

FIG. 2 illustrates a block diagram illustrating the mail server 30 when the mail server 30 is achieved by one computer.

As illustrated in FIG. 2, the mail server 30 includes an operation unit 31, a display 32, a communication unit 33, a storage unit 34, and a control unit 35. The operation unit 31 is an input device, such as a keyboard and a computer mouse, with which various kinds of operations are entered. The display 32 is a display device such as a liquid crystal display (LCD) that displays various kinds of information. The communication unit 33 is a communication device that communicates with an external device via the network or directly by wired or wireless communications without via the network. The storage unit 34 is a non-volatile storage device such as a semiconductor memory or a hard disk drive (HDD) that stores various kinds of information. The control unit 35 controls the whole mail server 30.

The storage unit 34 includes a maintenance-mail mail box 34a for storing the maintenance mails and a communication-confirmation mail box 34b for storing the e-mail (hereinafter referred to as "communication-confirmation-request mail") for a request of the communication confirmation.

The storage unit 34 stores a Dovecot program 34c, a Postfix program 34d, and a mail-format confirmation program 34e. The Dovecot program 34c is a program for Dovecot that receives the e-mail by post office protocol version 3 (POP3) or internet message access protocol (IMAP). The Postfix program 34d is a program for Postfix that transmits the e-mail by simple mail transfer protocol (SMTP). The mail-format confirmation program 34e is a program for executing the communication confirmation.

The storage unit 34 can store analysis result information 34f that indicates analysis results of the maintenance mail for each maintenance mail.

The control unit 35 includes, for example, a central processing unit (CPU), a read-only memory (ROM), and a random-access memory (RAM). The ROM stores programs and various kinds of data. The RAM is used as a work area of the CPU. The CPU executes the programs stored in the ROM or the storage unit 34.

The control unit 35 executes the Dovecot program 34c to achieve a Dovecot 35a. The control unit 35 executes the Postfix program 34d to achieve a Postfix 35b. The control unit 35 executes the mail-format confirmation program 34e to achieve a mail-format confirming unit 35c that executes the communication confirmation.

The case where the mail server 30 is achieved by one computer has been described above. However, the mail server 30 may be built on the cloud.

Figure 3:
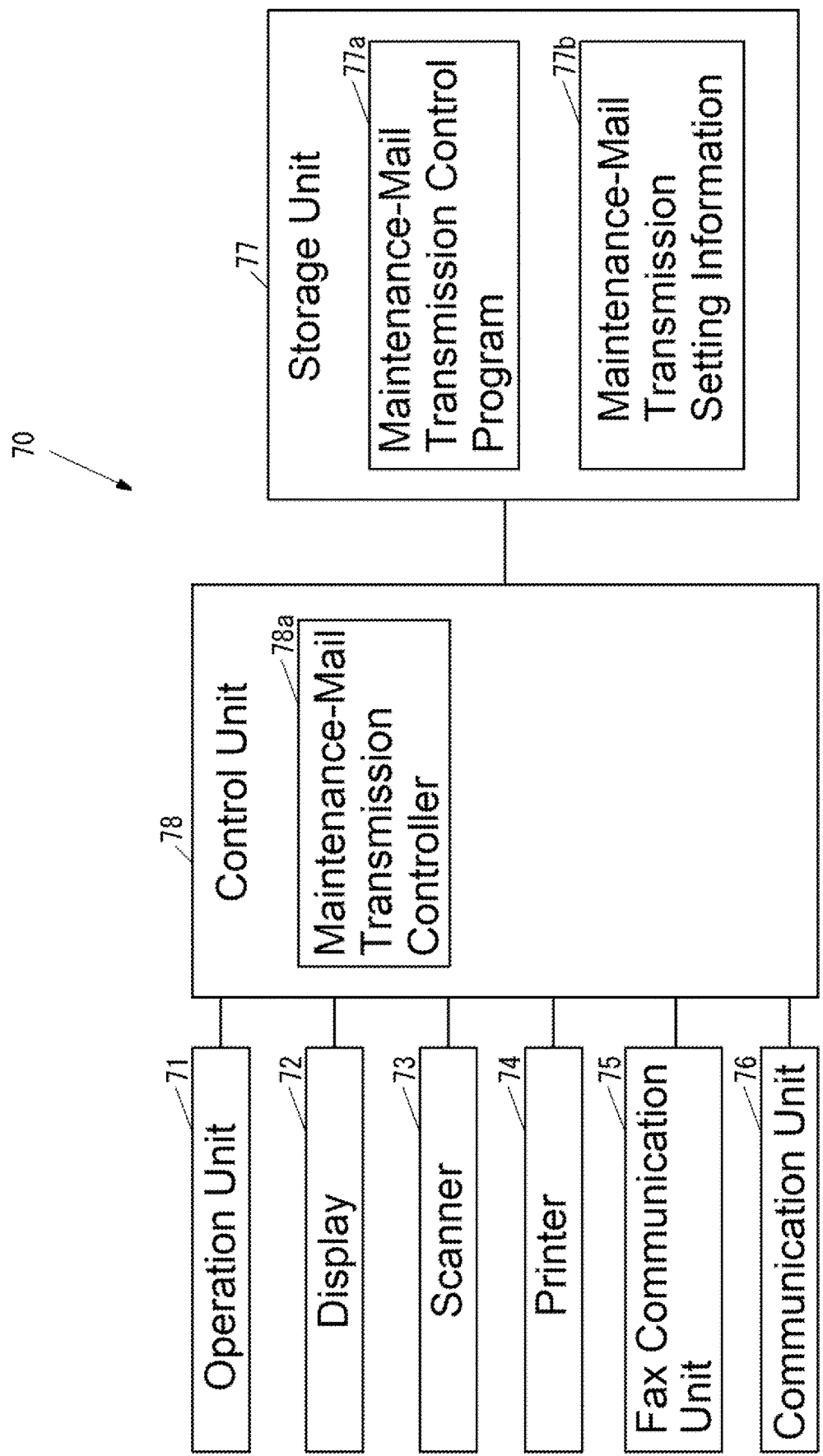
FIG. 3 illustrates a block diagram illustrating an image forming apparatus according to the one embodiment when the image forming apparatus is an MFP.

FIG. 3 illustrates a block diagram illustrating the image forming apparatus 70 when the image forming apparatus 70 is an MFP.

The image forming apparatus 70 illustrated in FIG. 3 includes an operation unit 71, a display 72, a scanner 73, a printer 74, a fax communication unit 75, a communication unit 76, a storage unit 77, and a control unit 78. The operation unit 71 is an input device, such as buttons, with which various kinds of operations are entered. The display 72 is a display device, such as an LCD, that displays various kinds of information. The scanner 73 is a reading device that reads an image from a document. The printer 74 is a print device that prints an image on a recording medium such as a paper sheet. The fax communication unit 75 is a fax device that performs fax communications with an external facsimile device (not illustrated) via a communication line such as a dial-up line. The communication unit 76 is a communication device that communicates with an external device via the network or directly by wired or wireless communications without via the network. The storage unit 77 is a non-volatile storage device, such as a semiconductor memory or an HDD, that stores various kinds of information. The control unit 78 controls the whole image forming apparatus 70.

The storage unit 77 stores a maintenance-mail transmission control program 77a for controlling the transmission of the maintenance mail.

The storage unit 77 stores maintenance-mail transmission setting information 77b that indicates the transmission setting of the maintenance mail.

Figure 4:
FIG. 4 illustrates one example of maintenance-mail transmission setting information illustrated in FIG. 3.

FIG. 4 illustrates one example of the maintenance-mail transmission setting information 77b.

As illustrated in FIG. 4, the maintenance-mail transmission setting information 77b includes a combination of a timing of transmission of the maintenance mail, an e-mail address of a destination of the maintenance mail, a message format of the maintenance mail such as a text format and a hypertext markup language (HTML) format, and a type of the report attached to the maintenance mail for each maintenance mail.

The e-mail addresses of the destinations of the maintenance mail include, for example, an e-mail address (hereinafter referred to as "maintenance-mail mail address") for the maintenance mail of the device-information management system 20 and an e-mail address of a service person.

Reports attachable to the maintenance mail include, for example, an event log, a status page, a service status page, a network status page, and a maintenance report. The event log indicates logs of various kinds of errors in the image forming apparatus 70. The status page indicates settings of various kinds of functions of the image forming apparatus 70. The service status page indicates a setting for a service person, namely a more detailed setting than the ordinary status page, in the image forming apparatus 70. The network status page indicates a setting of the network in the image forming apparatus 70. The maintenance report indicates a setting for maintenance of the image forming apparatus 70. The event log includes, for example, a log of a jam occurrence in the printer 74, a log of a toner replacement in the printer 74, and a log of a system error in the image forming apparatus 70. The status page includes, for example, a set value of a copy function such as which size of a recording medium is housed in which cassette, a set value of a print function, a fax address of the image forming apparatus 70, and a set value of a fax function such as the number of retries of the fax. The network status page includes, for example, an internet protocol (IP) address of the image forming apparatus 70 and a setting of a network protocol available for the image forming apparatus 70. The maintenance report includes, for example, a telephone number displayed on the display 72 when an error occurs in the image forming apparatus 70.

A specific format (hereinafter referred to as "processable mail format") of the maintenance mail processable by the device-information accumulation system 50 in the embodiment is: a text format as a message format where the types of the reports attached to the maintenance mail are the event log, the status page, the service status page, the network status page, and the maintenance report when the image forming apparatus is an MFP; or a text format as a message format where the types of the reports attached to the maintenance mail are the event log, the status page, the service status page, and the network status page when the image forming apparatus is a printer-only machine.

The control unit 78 illustrate in FIG. 3 includes, for example, a CPU, a ROM that stores programs and various kinds of data, and a RAM used as a work area for the CPU. The CPU executes the programs stored in the ROM or the storage unit 77.

The control unit 78 executes the maintenance-mail transmission control program 77a to achieve a maintenance-mail transmission controller 78a that controls the transmission of the maintenance mail.

Figure 5:
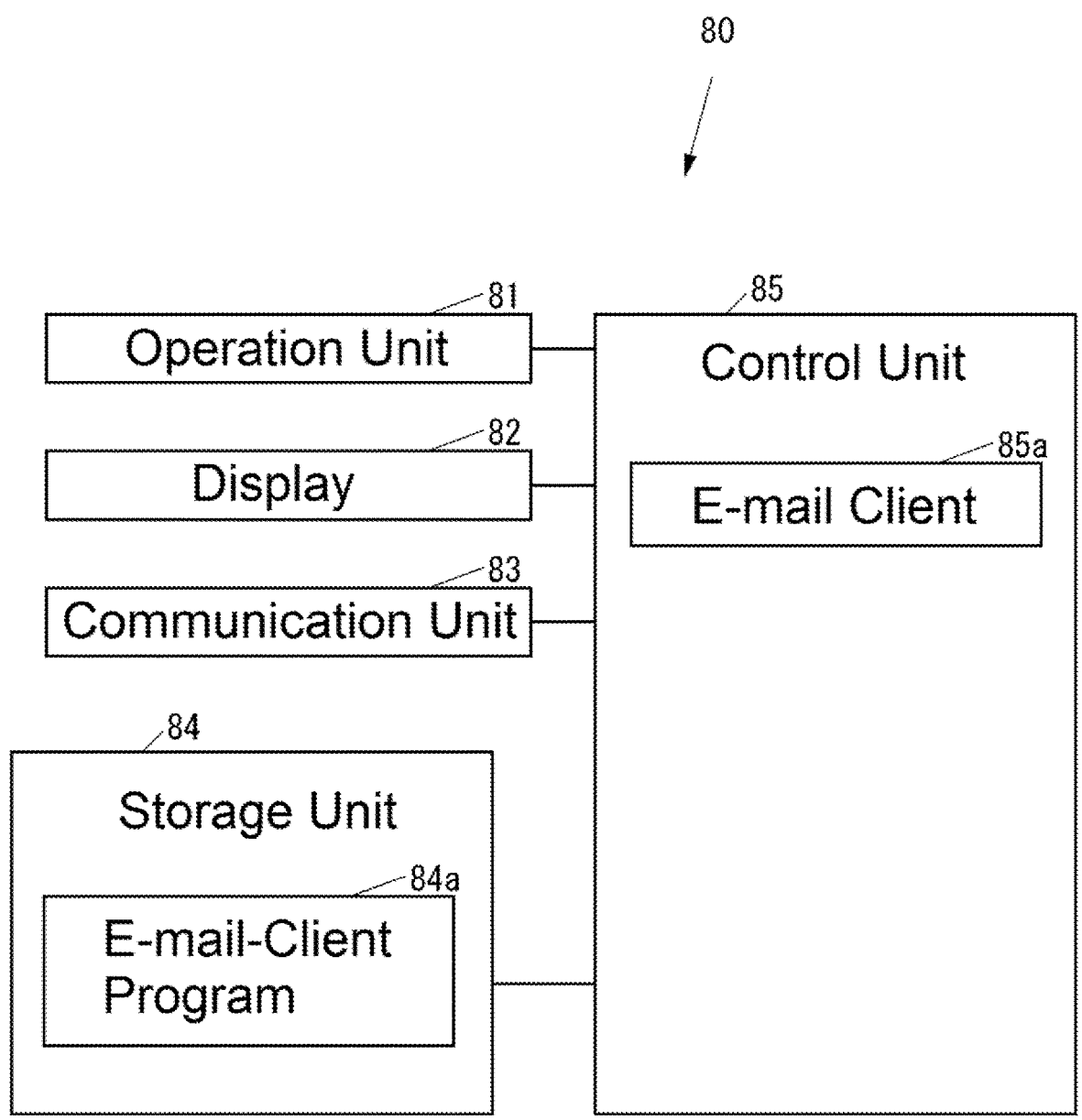
FIG. 5 illustrates a block diagram illustrating a user terminal according to the one embodiment.

FIG. 5 illustrates a block diagram illustrating the user terminal 80.

As illustrated in FIG. 5, the user terminal 80 includes an operation unit 81, a display 82, a communication unit 83, a storage unit 84, and a control unit 85. The operation unit 81 is an input device, such as a keyboard and a computer mouse, with which various kinds of operations are entered. The display 82 is a display device, such as an LCD, that displays various kinds of information. The communication unit 83 is a communication device that communicates with an external device via the network or directly by wired or wireless communications without via the network. The storage unit 84 is a non-volatile storage device, such as a semiconductor memory or an HDD, that stores various kinds of information. The control unit 85 controls the whole user terminal 80.

The storage unit 84 stores an e-mail-client program 84a.

The control unit 85 includes, for example, a CPU, a ROM that stores programs and various kinds of data, and a RAM used as a work area for the CPU. The CPU executes the programs stored in the ROM or the storage unit 84.

The control unit 85 executes the e-mail-client program 84a to achieve an e-mail client 85a.

Next, a description will be given of the operations of the system 10.

First, a description will be given of the operations of executing the transmission setting of the maintenance mail by the image forming apparatus 70.

Figure 6:
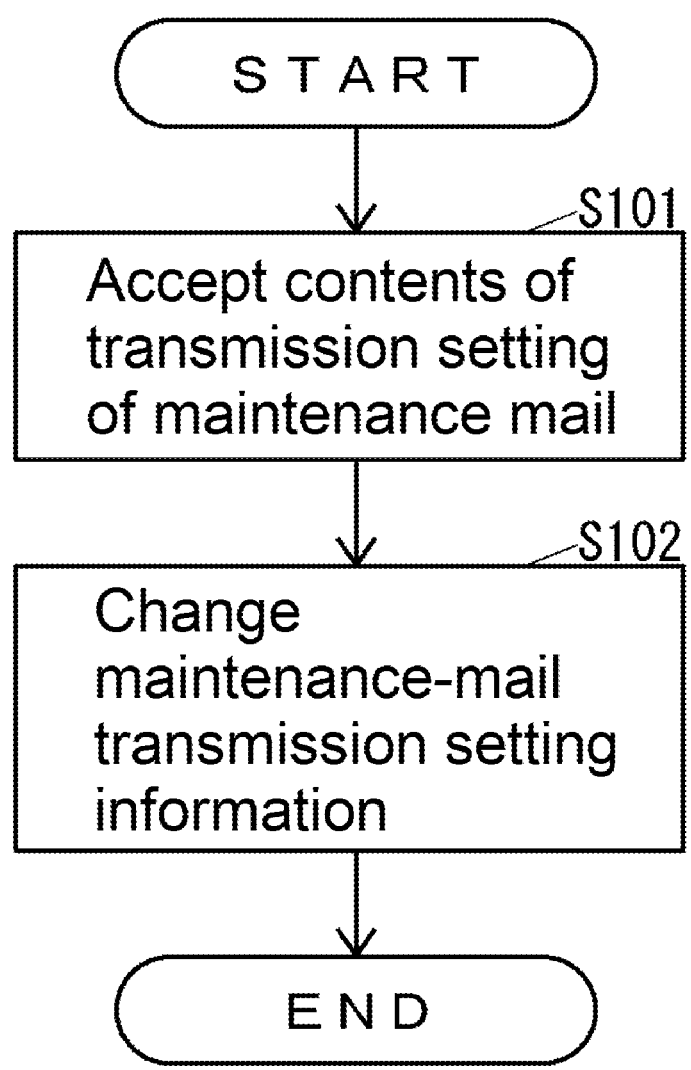
FIG. 6 illustrates operations of executing a transmission setting of a maintenance mail by the image forming apparatus according to the one embodiment.

FIG. 6 illustrates the operations of executing the transmission setting of the maintenance mail by the image forming apparatus 70.

The maintenance-mail transmission controller 78a of the image forming apparatus 70 executes the operations illustrated in FIG. 6 when a start of the transmission setting of the maintenance mail is instructed via the operation unit 71.

As illustrated in FIG. 6, the maintenance-mail transmission controller 78a accepts contents of the transmission setting of the maintenance mail instructed via the operation unit 71 (Step S101).

Subsequently, the maintenance-mail transmission controller 78a changes the maintenance-mail transmission setting information 77b corresponding to the contents accepted at Step S101 (Step S102) and then terminates the operations illustrated in FIG. 6.

Next, a description will be given of the operations of the system 10 when the maintenance mail is transmitted to the device-information management system 20 from the image forming apparatus 70.

Figure 7:
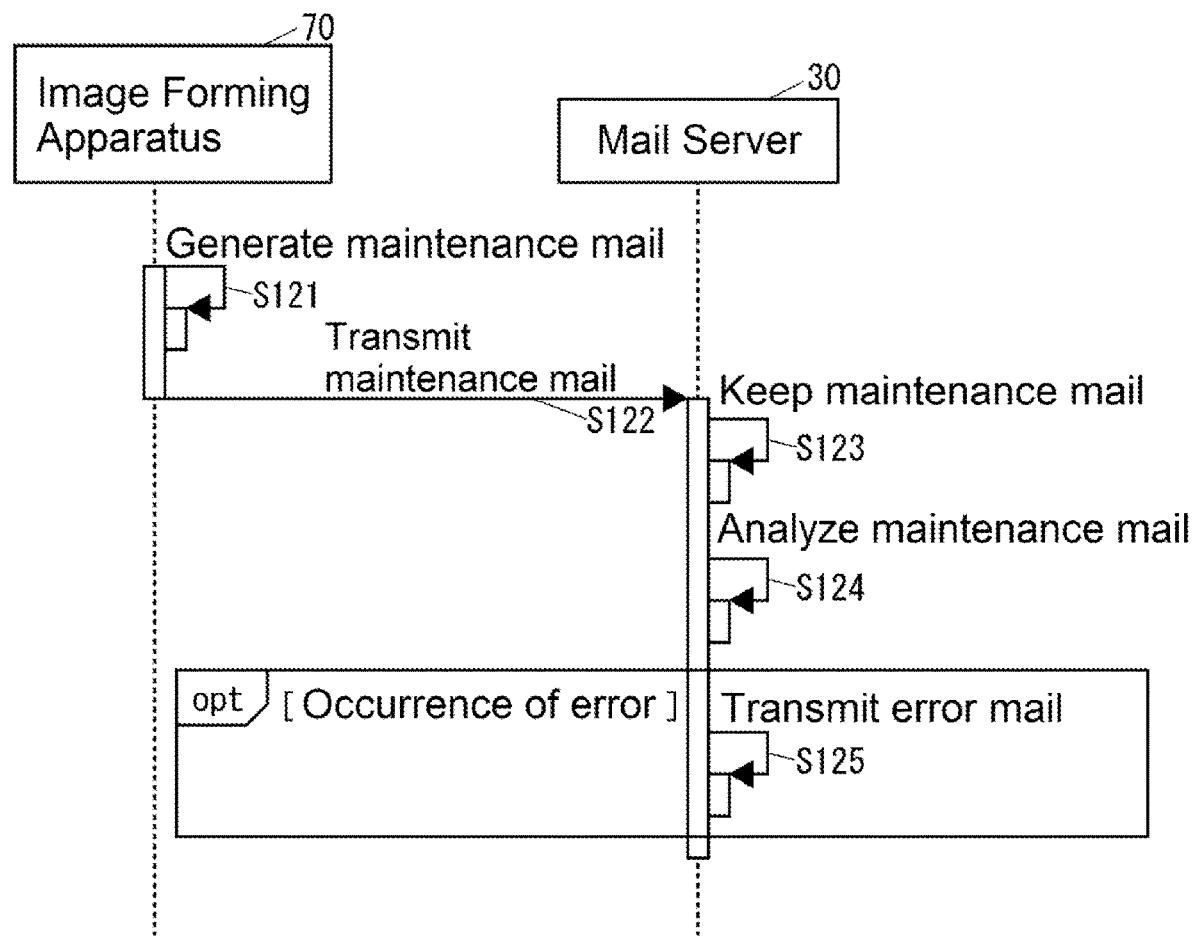
FIG. 7 illustrates operations of the system according to the one embodiment when the maintenance mail is transmitted to a device-information management system from the image forming apparatus.

FIG. 7 illustrates the operations of the system 10 when the maintenance mail is transmitted to the device-information management system 20 from the image forming apparatus 70.

When transmission is instructed via the operation unit 71 or a transmission timing set in the maintenance-mail transmission setting information 77b reaches with respect to the maintenance mail where the maintenance-mail address is set, among the maintenance mails indicated in the maintenance-mail transmission setting information 77b, as illustrated in FIG. 7, the maintenance-mail transmission controller 78a of the image forming apparatus 70 generates this maintenance mail, based on the message format and the report types set in the maintenance-mail transmission setting information 77b with respect to this maintenance mail (Step S121).

Subsequently, the maintenance-mail transmission controller 78a transmits the maintenance mail generated at Step S121 to the e-mail address set in the maintenance-mail transmission setting information 77b with respect to this maintenance mail, namely to the maintenance-mail mail address (Step S122).

The e-mail transmitted to the maintenance-mail mail address is automatically sorted out to any of the mail servers of the device-information management system 20 by the DNS 40. The following gives a description assuming that the maintenance mail transmitted at Step S122 has been sorted out to the mail server 30 by the DNS 40.

When receiving the maintenance mail transmitted at Step S122, the Dovecot 35a of the mail server 30 keeps this maintenance mail in the maintenance-mail mail box 34a (Step S123).

The mail-format confirming unit 35c of the mail server 30 monitors the maintenance-mail mail box 34a and, after the process at Step S123, analyzes the maintenance mail kept at Step S123 (Step S124).

Figure 8:
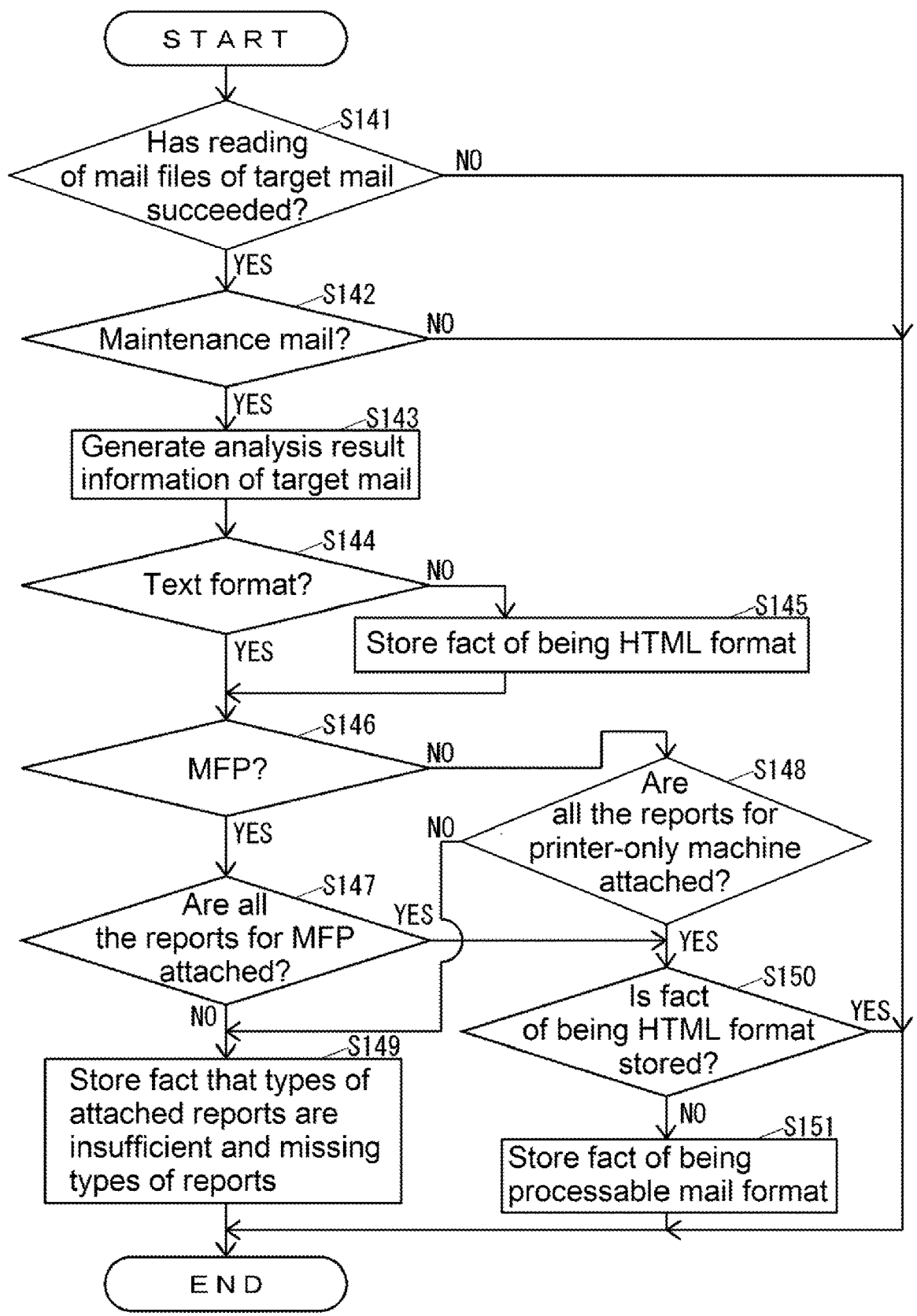
FIG. 8 illustrates operations of analyzing the maintenance mail by the mail server in the operations illustrated in FIG. 7.

FIG. 8 illustrates the operations of analyzing the maintenance mail by the mail server 30 at Step S124.

As illustrated in FIG. 8, the mail-format confirming unit 35c determines whether reading of mail files of the e-mail (hereinafter referred to as "target mail" in the description in FIG. 8) as target for analysis has succeeded or not (Step S141).

When it is determined that the reading of the mail files of the target mail has been succeeded at Step S141, the mail-format confirming unit 35c determines whether the target mail is the maintenance mail or not (Step S142). Here, the mail-format confirming unit 35c determines that the target mail is the maintenance mail when a specific keyword is present in the body text of the target mail.

When it is determined that the reading of the mail files of the target mail has failed at Step S141 or it is determined that the target mail is not the maintenance mail at Step S142, the mail-format confirming unit 35c terminates the operations illustrated in FIG. 8.

When it is determined that the target mail is the maintenance mail at Step S142, the mail-format confirming unit 35c generates the analysis result information 34f of the target mail (Step S143). Here, in the maintenance mail, a serial number that is identification information of the image forming apparatus as a transmission source is described in the body text. Accordingly, the mail-format confirming unit 35c includes the serial number of the image forming apparatus as the transmission source in the analysis result information 34f generated at Step S143. The mail-format confirming unit 35c includes a reception date and time of the target mail in the analysis result information 34f generated at Step S143.

After Step S143, the mail-format confirming unit 35c determines whether the message format of the target mail is the text format or not (Step S144).

When it is determined that the message format of the target mail is not the text format, namely is the HTML format at Step S144, the mail-format confirming unit 35c stores a fact that the message format is the HTML format in the analysis result information 34f generated at Step S143 (Step S145).

When it is determined that the message format of the target mail is the text format at Step S144 or the process terminates at Step S145, the mail-format confirming unit 35c determines whether the image forming apparatus that has transmitted the target mail is the MFP or not (Step S146). Here, in the maintenance mail, a model name of the image forming apparatus as the transmission source is described in the body text. Accordingly, the mail-format confirming unit 35c can determine whether the image forming apparatus as the transmission source is any one of the MFP or the printer-only machine based on the model name of the image forming apparatus as the transmission source described in the body text of the target mail.

When it is determined that the image forming apparatus that has transmitted the target mail is the MFP at Step S146, the mail-format confirming unit 35c determines whether all of the reports for the MFP, namely all of the event log, the status page, the service status page, the network status page, and the maintenance report are attached to the target mail or not (Step S147).

When it is determined that the image forming apparatus that has transmitted the target mail is not the MFP, namely is the printer-only machine at Step S146, the mail-format confirming unit 35c determines whether all of the reports for the printer-only machine, namely all of the event log, the status page, the service status page, and the network status page are attached to the target mail or not (Step S148).

When it is determined that at least one of the event log, the status page, the service status page, the network status page, or the maintenance report is not attached to the target mail at Step S147 or it is determined that at least one of the event log, the status page, the service status page, or the network status page is not attached to the target mail at Step S148, the mail-format confirming unit 35c stores a fact that the types of the attached reports are insufficient and the missing types of the reports in the analysis result information 34f generated at Step S143 (Step S149) and then terminates the operations illustrated in FIG. 8.

When it is determined that all of the event log, the status page, the service status page, the network status page, and the maintenance report are attached to the target mail at Step S147 or it is determined that all of the event log, the status page, the service status page, and the network status page are attached to the target mail at Step S148, the mail-format confirming unit 35c determines whether a fact that the message format is the HTML format is stored in the analysis result information 34f generated at Step S143 or not (Step S150).

When it is determined that the fact that the message format is the HTML format is stored in the analysis result information 34f at Step S150, the mail-format confirming unit 35c terminates the operations illustrated in FIG. 8.

When it is determined that the fact that the message format is the HTML format is not stored in the analysis result information 34f at Step S150, the mail-format confirming unit 35c stores a fact of being a processable mail format in the analysis result information 34f generated at Step S143 (Step S151) and then terminates the operations illustrated in FIG. 8.

The mail-format confirming unit 35c deletes the analysis result information 34f generated at Step S143 in, for example, 24 hours.

When it is determined that the reading of the mail files of the target mail has failed at Step S141, that is, when an error has occurred during an analysis of the maintenance mail, as illustrated in FIG. 7, the mail-format confirming unit 35c transmits an error mail that indicates the fact that the error has occurred during the analysis of the maintenance mail to an e-mail address (hereinafter referred to as "an error-notification mail address") for reporting a system error by the Postfix 35b after the process at Step S124 (Step S125).

Next, a description will be given of the operations of the system 10 when the communication confirmation is executed.

Figure 9:
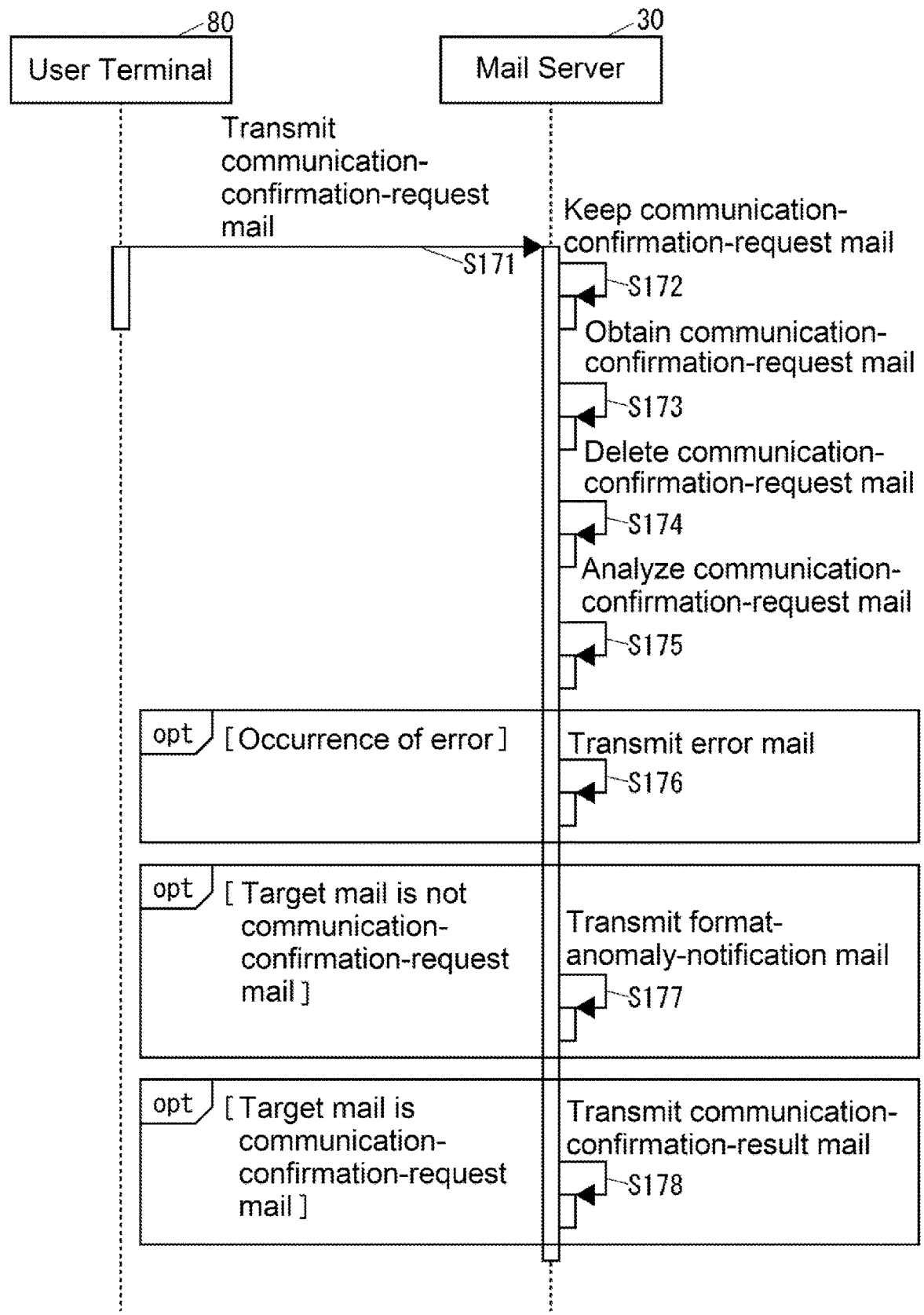
FIG. 9 illustrates the operations of the system according to the one embodiment when a communication confirmation is executed.

FIG. 9 illustrates the operations of the system 10 when the communication confirmation is executed.

An applicant for execution of the communication confirmation (hereinafter referred to as "communication-confirmation applicant") can instruct the user terminal 80 to transmit the communication-confirmation-request mail to an e-mail address for the communication confirmation (hereinafter referred to as "communication-confirmation mail address") via the operation unit 81 of the user terminal 80. Accordingly, the e-mail client 85a of the user terminal 80 transmits the communication-confirmation-request mail to the communication-confirmation mail address (Step S171). Here, the communication-confirmation mail address is an e-mail address different from the maintenance-mail mail address. The communication-confirmation-request mail is an e-mail that satisfies at least one of: only the serial number of the image forming apparatus as the target of the communication confirmation being described in a subject; and only the serial number of the image forming apparatus as the target of the communication confirmation being described in a body text. When only the serial number of the image forming apparatus is described in each of the subject and the body text, the communication-confirmation-request mail becomes a communication-confirmation-request mail of the image forming apparatus specified by the serial number described in the subject. A user of the user terminal 80 can identify the image forming apparatus to which the transmission setting of the maintenance mail has been instructed as the image forming apparatus as the target of the communication confirmation.

The e-mails transmitted to the communication-confirmation mail address are automatically sorted out into any of the mail servers of the device-information management system 20 by the DNS 40. The following gives a description assuming that the communication-confirmation-request mail transmitted at Step S171 has been sorted out into the mail server 30 by the DNS 40.

Upon receiving the communication-confirmation-request mail transmitted at Step S171, the Dovecot 35a of the mail server 30 keeps this communication-confirmation-request mail in the communication-confirmation mail box 34b (Step S172).

The mail-format confirming unit 35c of the mail server 30 monitors the communication-confirmation mail box 34b; obtains the communication-confirmation-request mail kept at Step S172 after the process at Step S172 (Step S173); deletes the communication-confirmation-request mail obtained at Step S173 from the communication-confirmation mail box 34b (Step S174); and analyzes the communication-confirmation-request mail obtained at Step S173 (Step S175).

Figure 10:
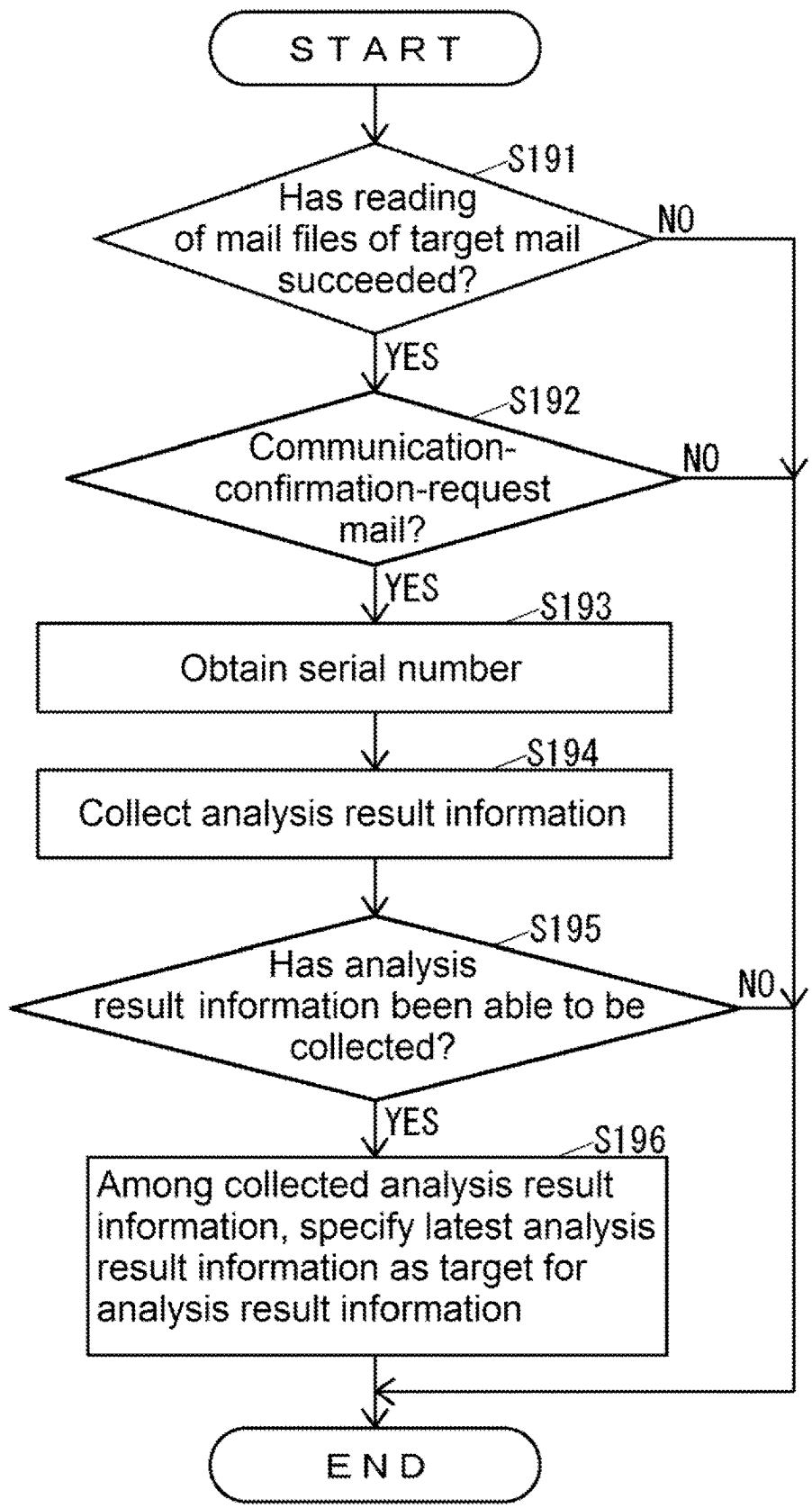
FIG. 10 illustrates the operations of analyzing a communication-confirmation-request mail by the mail server in the operations illustrated in FIG. 9.

FIG. 10 illustrates the operations of analyzing the communication-confirmation-request mail by the mail server 30 at Step S175.

As illustrated in FIG. 10, the mail-format confirming unit 35c determines whether reading of the mail files of the e-mail (hereinafter referred to as "target mail" in the description in FIG. 10) as target for analysis has succeeded or not (Step S191).

When it is determined that the reading of the mail files of the target mail has succeeded at Step S191, the mail-format confirming unit 35c determines whether the target mail is the communication-confirmation-request mail or not (Step S192). Here, the mail-format confirming unit 35c determines that the target mail is the communication-confirmation-request mail when only the serial number of the image forming apparatus is present in at least one of the subject and the body text of the target mail.

When it is determined that the reading of the mail files of the target mail has failed at Step S191 or it is determined that the target mail is not the communication-confirmation-request mail at Step S192, the mail-format confirming unit 35c terminates the operations illustrated in FIG. 10.

When it is determined that the target mail is the communication-confirmation-request mail at Step S192, the mail-format confirming unit 35c obtains the serial number of the image forming apparatus as the target of the target mail (Step S193). Here, when only the serial number of the image forming apparatus is present in the subject of the target mail, the mail-format confirming unit 35c obtains the serial number described in the subject of the target mail as the serial number of the image forming apparatus as the target of the target mail. When nothing is described in the subject of the target mail or something other than the serial number of the image forming apparatus is described, the mail-format confirming unit 35c obtains the serial number described in the body text of the target mail as the serial number of the image forming apparatus as the target of the target mail.

After the process at Step S193, the mail-format confirming unit 35c collects analysis result information containing the serial numbers obtained at Step S193 from all the mail servers included in the device-information management system 20 (Step S194). That is, the mail-format confirming unit 35c collects, from the storage unit 34 that the mail server 30 itself realizes, analysis result information 34f that contains the serial number obtained in Step S193, and also requests of all the mail servers, included in the device-information management system 20, other than the mail server 30 analysis result information that contains serial numbers obtained at Step S193. Mail-format confirming units in mail servers, included in the device-information management system 20, other than the mail server 30 collects collect, from storage units that the mail servers themselves realize, analysis result information that contains serial numbers designated by the mail-format confirming unit 35c, and transmit the collected analysis result information to the mail-format confirming unit 35c.

The mail-format confirming unit 35c determines whether analysis result information has been able to be collected or not at Step S194 (Step S195).

When it is determined that analysis result information has not been able to be collected at Step S195, the mail-format confirming unit 35c terminates the operations illustrated in FIG. 10.

When it is determined that the analysis result information has been able to be collected at Step S195, the mail-format confirming unit 35c specifies the analysis result information where the reception date and time included in the analysis result information is the latest as the target analysis result information among the analysis result information collected at Step S194 (Step S196) and then terminates the operations illustrated in FIG. 10.

When it is determined that the reading of the mail files of the target mail has failed at Step S191, that is, it is determined that an error has occurred during the analysis of the communication-confirmation-request mail, the mail-format confirming unit 35c, as illustrated in FIG. 9, transmits an error mail that indicates the fact that the error has occurred during the analysis of the communication-confirmation-request mail to the error-notification mail address by the Postfix 35b after the process at Step S175 (Step S176).

When it is determined that the target mail is not the communication-confirmation-request mail at Step S192, the mail-format confirming unit 35c, as illustrated in FIG. 9, transmits an e-mail (hereinafter referred to as "format-anomaly-notification mail") that indicates a fact that the communication confirmation is inexecutable due to a format anomaly of the e-mail addressed to the communication-confirmation mail address to a specific e-mail address by the Postfix 35b after the process at Step S175 (Step S177). Consequently, after having received the format-anomaly-notification mail transmitted to the specific e-mail address by, for example, the e-mail client 85a of the user terminal 80, the communication-confirmation applicant can confirm that the communication confirmation has been inexecutable due to a format anomaly of the e-mail addressed to the communication-confirmation mail address, by confirming the received format-anomaly-notification mail. Here, when a return e-mail address is designated in the target mail, the specific e-mail address is the return e-mail address designated in the target mail. When a return e-mail address is not designated in the target mail, it is the e-mail address of the transmission source of the target mail.

FIG. 11 illustrates one example of a subject and a body text of the format-anomaly-notification mail.

As illustrated in FIG. 11, the format-anomaly-notification mail is an e-mail that indicates a fact that the communication confirmation is inexecutable due to the format anomaly of the e-mail addressed to the communication-confirmation mail address.

When it is determined that the target mail is the communication-confirmation-request mail at Step S192, as illustrated in FIG. 9, the mail-format confirming unit 35c transmits an e-mail (hereinafter referred to as "communication-confirmation-result mail") that indicates the result of the communication confirmation to the specific e-mail address by the Postfix 35b after the process at Step S175 (Step S178). Consequently, after having received the communication-confirmation-result mail transmitted to the specific e-mail address by, for example, the e-mail client 85a of the user terminal 80, the communication-confirmation applicant can confirm the result of the communication confirmation by confirming the received communication-confirmation-result mail. Here, when a return e-mail address is designated in the target mail, the specific e-mail address is the return e-mail address designated in the target mail. When a return e-mail address is not designated in the target mail, the specific e-mail address is the e-mail address of the transmission source of the target mail.

FIGS. 12A, 12B, 13A, 13B, and 14 each illustrate one example of the subject and the body text of the communication-confirmation-result mail.

The communication-confirmation-result mail illustrated in FIG. 12A is an e-mail that indicates a fact that the corresponding maintenance mail has not been received from the image forming apparatus. When it is determined that the analysis result information has not been able to be collected at Step S195, the mail-format confirming unit 35c transmits the communication-confirmation-result mail as illustrated in FIG. 12A. A character string of "N2N1234567" illustrated in FIG. 12A is the serial number of the image forming apparatus as the target of the communication confirmation and is the serial number obtained at Step S193.

The communication-confirmation-result mail illustrated in FIG. 12B is an e-mail that indicates a fact that the valid maintenance mail has been received from the image forming apparatus. When the mail-format confirming unit 35c specifies the analysis result information at Step S196 and the analysis result information specified at Step S196 indicates a fact of being a processable mail format, the mail-format confirming unit 35c transmits the communication-confirmation-result mail as illustrated in FIG. 12B. The character string of "N2N1234567" illustrated in FIG. 12B is the serial number of the image forming apparatus as the target of the communication confirmation and is the serial number obtained at Step S193. A character string of "2017/03/29 15:30:30" illustrated in FIG. 12B is the reception date and time of the maintenance mail as the target of the communication confirmation and is the reception date and time included in the analysis result information specified at Step S196.

The communication-confirmation-result mail illustrated in FIG. 13A is an e-mail that indicates a fact that the maintenance mail where the message format is the HTML format is received from the image forming apparatus. When the mail-format confirming unit 35c specifies the analysis result information at Step S196, and when a fact that the message format is the HTML format is indicated in the analysis result information specified at Step S196, and a fact that the types of the attached reports are insufficient is not indicated in the analysis result information specified at Step S196, the mail-format confirming unit 35c transmits the communication-confirmation-result mail as illustrated in FIG. 13A. The character string of "N2N1234567" illustrated in FIG. 13A is the serial number of the image forming apparatus as the target of the communication confirmation and is the serial number obtained at Step S193. The character string of "2017/03/29 15:30:30" illustrated in FIG. 13A is the reception date and time of the maintenance mail as the target of the communication confirmation and is the reception date and time included in the analysis result information specified at Step S196.

The communication-confirmation-result mail illustrated in FIG. 13B is an e-mail that indicates a fact that the maintenance mail where the types of the attached reports are insufficient is received from the image forming apparatus. When the mail-format confirming unit 35c specifies the analysis result information at Step S196, and when a fact that the types of the attached reports are insufficient is indicated in the analysis result information specified at Step S196, and a fact that the message format is the HTML format is not indicated in the analysis result information specified at Step S196, the mail-format confirming unit 35c transmits the communication-confirmation-result mail as illustrated in FIG. 13B. The character string of "N2N1234567" illustrated in FIG. 13B is the serial number of the image forming apparatus as the target of the communication confirmation and is the serial number obtained at Step S193. The character string of "2017/03/29 15:30:30" illustrated in FIG. 13B is the reception date and time of the maintenance mail as the target of the communication confirmation and is the reception date and time included in the analysis result information specified at Step S196. Terms of "EventLog," "StatusPage," "the event log," and "the status page" illustrated in FIG. 13B are the types of the reports insufficient in the maintenance mail as the target of the communication confirmation and are "the insufficient report types" included in the analysis result information specified at Step S196.

The communication-confirmation-result mail illustrated in FIG. 14 is an e-mail that indicates a fact that the maintenance mail where the message format is the HTML format, and the types of the attached reports are insufficient is received from the image forming apparatus. When the mail-format confirming unit 35c specifies the analysis result information at Step S196, and when a fact that the message format is the HTML format and a fact that the types of the attached reports are insufficient are indicated in the analysis result information specified at Step S196, the mail-format confirming unit 35c transmits the communication-confirmation-result mail as illustrated in FIG. 14. The character string of "N2N1234567" illustrated in FIG. 14 is the serial number of the image forming apparatus as the target of the communication confirmation and is the serial number obtained at Step S193. The character string of "2017/03/29 15:30:30" illustrated in FIG. 14 is the reception date and time of the maintenance mail as the target of the communication confirmation and is the reception date and time included in the analysis result information specified at Step S196. The terms of "EventLog," "StatusPage," "the event log," and "the status page" illustrated in FIG. 14 are the types of the reports insufficient in the maintenance mail as the target of the communication confirmation and are "the insufficient report types" included in the analysis result information specified at Step S196.

As described above, executing the communication confirmation by the mail-format confirmation system 60 (Steps S124 and S175) eliminates the need of executing the communication confirmation by a person, thus ensuring the facilitated communication confirmation.

Requesting the communication confirmation using an e-mail by the mail-format confirmation system 60 (Step S171) ensures facilitating the request of the communication confirmation.

Transmitting the result of the communication confirmation by an e-mail in the mail-format confirmation system 60 (Step S178) ensures facilitating the confirmation of the result of the communication confirmation.

While the management target device in the embodiment is the image forming apparatus such as the MFP or the printer-only machine, the management target device may be an image forming apparatus other than the MFP and the printer-only machine, such as a copy-only machine, a FAX-only machine, and a scanner-only machine, and may be an electronic device other than the image forming apparatus, such as a PC.

Embodiment Examples of the Disclosure

A mail-format confirmation system of the disclosure includes a mail-format confirming unit. The mail-format confirmation means executes a confirmation whether a format of a maintenance mail as an e-mail for reporting device information about an electronic device is a specific format processable by a device-information accumulation system or not. The device-information accumulation system obtains and accumulates the device information from the maintenance mail.

This configuration causes the mail-format confirmation system of the disclosure to execute the confirmation whether the format of the e-mail for reporting device information about the electronic device is the specific format processable by the device-information accumulation system or not. Therefore, a person does not need to confirm whether the format of the e-mail for reporting the device information about the electronic device is the specific format processable by the device-information accumulation system or not, thus ensuring the facilitated confirmation.

In the mail-format confirmation system of the disclosure, the mail-format confirmation means may execute the confirmation when the confirmation is requested by an e-mail.

This configuration requests the confirmation whether the format of the e-mail for reporting the device information about the electronic device is the specific format processable by the device-information accumulation system or not by the e-mail from the mail-format confirmation system of the disclosure. This ensures the facilitated request of the confirmation whether the format of the e-mail for reporting the device information about the electronic device is the specific format processable by the device-information accumulation system or not.

In the mail-format confirmation system of the disclosure, the mail-format confirmation means may transmit a result of the confirmation by an e-mail.

This configuration causes the mail-format confirmation system of the disclosure to transmit the result of the confirmation whether the format of the e-mail for reporting the device information about the electronic device is the specific format processable by the device-information accumulation system or not by the e-mail. This ensures the facilitated result confirmation of the confirmation whether the format of the e-mail for reporting the device information about the electronic device is the specific format processable by the device-information accumulation system or not.

A mail-format confirmation program of the disclosure causes a computer to achieve a mail-format confirmation means. The mail-format confirmation means executes a confirmation whether a format of a maintenance mail as an e-mail for reporting device information about an electronic device is a specific format processable by a device-information accumulation system or not. The device-information accumulation system obtains and accumulates the device information from the maintenance mail.

This configuration causes the computer that executes the mail-format confirmation program of the disclosure to execute the confirmation whether the format of the e-mail for reporting device information about the electronic device is the specific format processable by the device-information accumulation system or not. Therefore, a person does not need to confirm whether the format of the e-mail for reporting the device information about the electronic device is the specific format processable by the device-information accumulation system or not, thus ensuring the facilitated confirmation.

Advantageous Effects of the Disclosure

The mail-format confirmation system and the mail-format confirmation program of the disclosure ensure the facilitated confirmation whether the format of the e-mail for reporting the device information about the electronic device is the specific format processable by the device-information accumulation system or not.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In a system constituted by a device-information management system including a network and a device-information accumulation system linked to the network, and by a management-target electronic device and a serviceperson terminal each linked via the network to the device-information management system, the management-target electronic device having an electronic-device control unit and an electronic-device storage unit storing a maintenance-mail transmission control program, the electronic-device control unit executing the maintenance-mail transmission control program thereby functioning as a maintenance-mail transmission controller for generating maintenance email reporting, via predetermined types of reports attached to the maintenance email, device information about the management-target electronic device and containing device-identifying information identifying the management-target electronic device, and the maintenance-mail transmission controller further for controlling transmission of the maintenance email to a maintenance-mail mail address of the device-information management system, the serviceperson terminal configured with an email client for creating a communication-confirmation-request email containing device-identifying information identifying the management-target electronic device and for transmitting the communication-confirmation-request email to a communication-confirmation mail address of the device-information management system, a mail-format confirmation system in the device-information management system, the mail-format confirmation system linked via the network to the device-information accumulation system and to the management-target electronic device and serviceperson terminal, and comprising:
  a mail server having a mail-server control unit and a mail-server storage unit storing a mail-format confirmation program, the mail-server control unit executing the mail-format confirmation program thereby functioning as a mail-format confirming unit for
    determining whether a given target email is a maintenance email transmitted from the management-target electronic device or a communication-confirmation-request email transmitted from the serviceperson terminal;
    if the target email is a maintenance email, executing confirmation as to whether the maintenance email is in a specific format processable by the device-information accumulation system;
    determining, based on the management-target electronic device, whether the predetermined types of reports are attached to the maintenance email;
    if the maintenance email is in the specific format and the predetermined types of reports are attached to the maintenance email, storing as analysis-result information in the mail-server storage unit the fact that the maintenance email is in the specific format, and including in the analysis-result information the device-identifying information identifying the management-target electronic device; and
    if the target email is a communication-confirmation-request email, collecting the analysis-result information in the mail-server storage unit, and transmitting, either to the transmission source of the given target email or to a specified email address, a communication-confirmation result email indicating that the analysis-result information has been collected; wherein
  the device-information accumulation system obtains and accumulates the device information from the maintenance email.

2. The mail-format confirmation system according to claim 1, wherein the mail-format confirming unit executes the confirmation when the confirmation is requested by an e-mail.

3. The mail-format confirmation system according to claim 1, wherein the mail-format confirming unit transmits a result of the confirmation by e-mail.

4. A non-transitory computer-readable recording medium storing a mail-format confirmation program, the mail-format confirmation program causing a computer to function as:
  the mail-format confirming unit of claim 1.

5. A system comprising:
  a device-information management system including a network;
  image forming apparatuses linked via the network to the device-information management system, the image forming apparatuses each having an image-forming-apparatus control unit and an image-forming-apparatus storage unit storing a maintenance-mail transmission control program, the image-forming-apparatus control unit executing the maintenance-mail transmission control program thereby functioning as a maintenance-mail transmission controller for generating maintenance email reporting, via predetermined types of reports attached to the maintenance email, device information about the image forming apparatuses and containing device-identifying information identifying the image forming apparatuses, and the maintenance-mail transmission controller further for controlling transmission of the maintenance email to a maintenance-mail mail address of the device-information management system;
  a serviceperson terminal linked via the network to the device-information management system, the serviceperson terminal configured with an email client for creating a communication-confirmation-request email containing device-identifying information identifying at least one management-target image forming apparatus and for transmitting the communication-confirmation-request email to a communication-confirmation mail address of the device-information management system;
  a mail-format confirmation system linked via the network to the image forming apparatuses and to the serviceperson terminal, and comprising mail servers including a specified mail server, the mail servers each having a mail-server control unit and a mail-server storage unit storing a mail-format confirmation program, the mail-server control unit executing the mail-format confirmation program thereby functioning as a mail-format confirming unit for
    determining whether a given target email is a maintenance email transmitted from the at least one management-target image forming apparatus, or a communication-confirmation-request email transmitted from the serviceperson terminal,
    if the target email is a maintenance email, executing confirmation as to whether the maintenance email is in a predetermined format,
    determining, based on the at least one management-target image forming apparatus, whether the predetermined types of reports are attached to the maintenance email,
    if the maintenance email is in the predetermined format and the predetermined types of reports are attached to the maintenance email, storing as analysis-result information in the mail-server storage unit the fact that the maintenance email is in the predetermined format, and including in the analysis-result information the device-identifying information identifying the maintenance-target image forming apparatus, and
    if the target email is a communication-confirmation-request email, collecting the analysis-result information from the mail-server storage units of mail servers designated by the mail-format confirming unit in the specified mail server and transmitting the collected analysis-result information to the mail-format confirming unit in the specified mail server, and transmitting, either to the transmission source of the given target email or to a specified email address, a communication-confirmation result email indicating that the analysis-result information has been collected.

6. The mail-format confirmation system according to claim 5, wherein the mail-format confirming unit determines that a given target email is a maintenance email when a specific keyword is present in the body text of the given target email.

7. The mail-format confirmation system according to claim 5, wherein the mail-format confirming unit determines that a given target email is a communication-confirmationrequest email when the device-identifying information alone is present in at least one of the subject line and the body text of the given target email.

\* \* \* \* \*